United States Patent
Tanaka et al.

(10) Patent No.: US 7,995,436 B2
(45) Date of Patent: Aug. 9, 2011

(54) RECORDING DEVICE AND RECORDING METHOD

(75) Inventors: Hisao Tanaka, Tokyo (JP); Masataka Mukai, Kanagawa (JP); Hiroki Matsui, Kanagawa (JP); Motohiro Terao, Kanagawa (JP)

(73) Assignee: Sony Corporation (JP)

( * ) Notice: Subject to any disclaimer, the term of this patent is extended or adjusted under 35 U.S.C. 154(b) by 329 days.

(21) Appl. No.: 12/286,882

(22) Filed: Oct. 2, 2008

(65) Prior Publication Data

US 2009/0092014 A1 Apr. 9, 2009

(30) Foreign Application Priority Data

Oct. 4, 2007 (JP) ................ P2007-260963

(51) Int. Cl.
*G11B 7/00* (2006.01)

(52) U.S. Cl. ............... 369/53.17; 369/53.26; 369/53.15; 369/47.14; 369/94

(58) Field of Classification Search ............ None
See application file for complete search history.

(56) References Cited

U.S. PATENT DOCUMENTS

| | | | |
|---|---|---|---|
| 5,608,715 A * | 3/1997 | Yokogawa et al. | 369/275.1 |
| 6,970,409 B2 | 11/2005 | Araki et al. | |
| 2005/0174902 A1 | 8/2005 | Fujita | |
| 2005/0213446 A1 | 9/2005 | Tanaka et al. | |
| 2007/0189138 A1 * | 8/2007 | Kuroda et al. | 369/47.51 |

FOREIGN PATENT DOCUMENTS

| | | |
|---|---|---|
| JP | 2001014808 A | 1/2001 |
| JP | 2002-216361 A | 8/2002 |
| JP | 2002-237050 A | 8/2002 |
| JP | 2005-222628 A | 8/2005 |
| JP | 2007-048449 A | 2/2007 |
| JP | 3953036 B2 | 5/2007 |
| JP | 2007-141350 A | 6/2007 |
| WO | 2005088613 A1 | 9/2005 |

OTHER PUBLICATIONS

Office Action from Japanese Application No. 2007-260963, dated Mar. 15, 2011.

* cited by examiner

*Primary Examiner* — Joseph Haley
(74) *Attorney, Agent, or Firm* — Lerner, David, Littenberg, Krumholz & Mentlik, LLP

(57) ABSTRACT

A recording device for performing recording supporting an optical disk-shaped recording medium having a laminated structure includes a first recording layer and a second recording layer. The recording device includes: a recording section configured to record data in the first recording layer and the second recording layer by irradiating the optical disk-shaped recording medium with laser light; a recording control section configured to control the recording section so as to perform recording in the first recording layer first and next perform recording in the second recording layer when the recording is performed sequentially on the optical disk-shaped recording medium; a pseudo defect area setting section configured to set a pseudo defect area in the second recording layer; and a defect registering section configured to register the real defect area and the pseudo defect area as a defect area.

5 Claims, 10 Drawing Sheets

REAR RECORDING LAYER

FRONT RECORDING LAYER

RECORDING DEVICE AND RECORDING METHOD

CROSS REFERENCES TO RELATED APPLICATIONS

The present application claims priority from Japanese Patent Application No. JP 2007-260963 filed in the Japan Patent Office on Oct. 4, 2007, the entire content of which is incorporated herein by reference.

BACKGROUND OF THE INVENTION

1. Field of the Invention

The present invention relates to a recording device that can perform data recording supporting an optical disk-shaped recording medium formed by laminating a plurality of recording layers, and a method of the recording device.

2. Description of the Related Art

A multiple-layer optical disk formed by laminating a plurality of two or more recording layers is already known as an optical disk-shaped recording medium (hereinafter referred to as an optical disk). In addition, as the multiple-layer optical disk, a recordable multiple-layer optical disk of a write-once type or a rewritable type whose recording layers are formed by a phase change film or a dye film, for example, is also known.

A difference in reflectance, transmittance or the like between a data recorded area and an unrecorded area in the recordable multiple-layer optical disk may become a factor in causing an offset in a tracking error signal, and thus hinder normal tracking servo control.

Accordingly, Japanese Patent Laid-Open No. 2007-141350, for example, discloses a constitution in which when data is additionally recorded on a multiple-layer optical disk having a first layer and a second layer, a border-in area is secured first, data is recorded in a data recording area following the border-in area, and then boundary information is recorded in a border-out area following the border-in area and the data recording area, and when data is recorded in the second layer in a case of performing the additional recording over the second layer from the first layer, the additional recording of the data is stopped temporarily in an area of the second layer which area corresponds to the border-in area secured in the first layer, and the additional recording of the data is resumed in an area that does not corresponds to the border-in area, whereby a skip area is formed.

This constitution is intended to solve a problem of tracking at a time of recording becoming unstable due to an effect of the boundary part of the border-in area present in the recording layer (the boundary part between the recorded area and the unrecorded area) when data recording is performed on a write-once basis.

SUMMARY OF THE INVENTION

It is desirable to ensure normal operation in tracking servo control without being affected by a boundary between a recorded area and an unrecorded area formed in a recording layer of a multiple-layer optical disk. It is particularly desirable to take a measure against an effect on tracking servo control of a boundary between a recorded area and an unrecorded area which boundary results from a defect area detected in a recording layer becoming the unrecorded area.

Accordingly, a recording device according to an embodiment of the present invention is configured as follows.

According to an embodiment of the present invention, there is provided a recording device for performing recording supporting an optical disk-shaped recording medium having a laminated structure including a first recording layer and a second recording layer. The recording device includes: a recording section configured to record data in the first recording layer and the second recording layer by irradiating the optical disk-shaped recording medium with laser light; a recording control section configured to control the recording section so as to perform recording in the first recording layer first and next perform recording in the second recording layer when the recording is performed sequentially on the optical disk-shaped recording medium; a pseudo defect area setting section configured to, when a real defect area is detected in the first recording layer while the recording section is recording data in the first recording layer, set a pseudo defect area in the second recording layer, the pseudo defect area including a corresponding area corresponding to the detected real defect area in the first recording layer in physical positional relation and a margin area continuing from each of a start position and an end position of the corresponding area; and a defect registering section configured to register the real defect area and the pseudo defect area as a defect area. The recording control section controls the recording section so as to prevent data recording from being performed in a defect area registered by the defect registering section.

Incidentally, in the above description, the real defect area in the first recording layer and the corresponding area in the second recording layer "correspond to each other in physical positional relation". This means that when an error factor such as a physical displacement or the like in a case where the first recording layer side and the second recording layer side are laminated to each other, for example, is eliminated, the real defect area in the first recording layer and the corresponding area in the second recording layer are at a same position as viewed from a direction of a disk surface of the optical disk-shaped recording medium, or opposed to each other at a same position in a direction perpendicular to the disk surface of the optical disk-shaped recording medium.

When the recording device having the above-described constitution performs recording on a multiple-layer optical disk-shaped recording medium (multiple-layer optical disk) formed by laminating a plurality of recording layers, and first performs data recording sequentially (sequential recording), the recording device performs the recording in the first recording layer and the second recording layer in this order. An area in which an actual defect is detected in a recording layer (real defect area) is registered as a defect area. The recording device performs control so as not to perform the recording in the thus registered defect area.

In addition, when a real defect area is detected in the first recording layer in which the data recording is performed first in the sequential recording, a pseudo defect area corresponding to the real defect area is set in the second recording layer. The pseudo defect area includes a corresponding area treated as corresponding to the real defect area on the first recording layer side in physical positional relation and a margin area continuing from each of a start position and an end position of the corresponding area. The pseudo defect area is also registered as a defect area. Then, the recording device operates so as not to record data in either of the real defect area and the pseudo defect area. When a recording surface of the multiple-layer optical disk is viewed from a plane surface, a physical range as the pseudo defect area includes the real defect area and boundaries between the real defect area and recorded areas preceding and succeeding the real defect area. Thus the vicinities of the boundaries between the real defect area and the recorded areas preceding and succeeding the real defect area (vicinities of the start position and the end position of the real defect area) are not irradiated with laser light.

According to another embodiment of the present invention, there is provided a recording method for performing recording supporting an optical disk-shaped recording medium having a laminated structure including a first recording layer and a second recording layer. The recording method includes the steps of: recording data in the first recording layer and the second recording layer by irradiating the optical disk-shaped recording medium with laser light so as to perform recording in the first recording layer first and next perform recording in the second recording layer when the recording is performed sequentially on the optical disk-shaped recording medium; when a real defect area is detected in the first recording layer while data is being recorded in the first recording layer, setting a pseudo defect area in the second recording layer, the pseudo defect area including a corresponding area corresponding to the detected real defect area in the first recording layer in physical positional relation and a margin area continuing from each of a start position and an end position of the corresponding area; and registering the real defect area and the pseudo defect area as a defect area. A recording control is performed so as to prevent data recording from being performed in a registered the defect area.

Thus, in the present invention, data recording is performed such that the vicinities of boundaries between an unrecorded area as a real defect area and recorded areas preceding and succeeding the unrecorded area are not irradiated with laser light. Thereby, the destabilization of tracking servo control which destabilization is caused by the presence of the vicinities of the boundaries corresponding to the above real defect area is prevented. Thus the reliability of data recording and reproduction on a multiple-layer optical disk is enhanced.

DETAILED DESCRIPTION OF PREFERRED EMBODIMENTS

Figure 1:
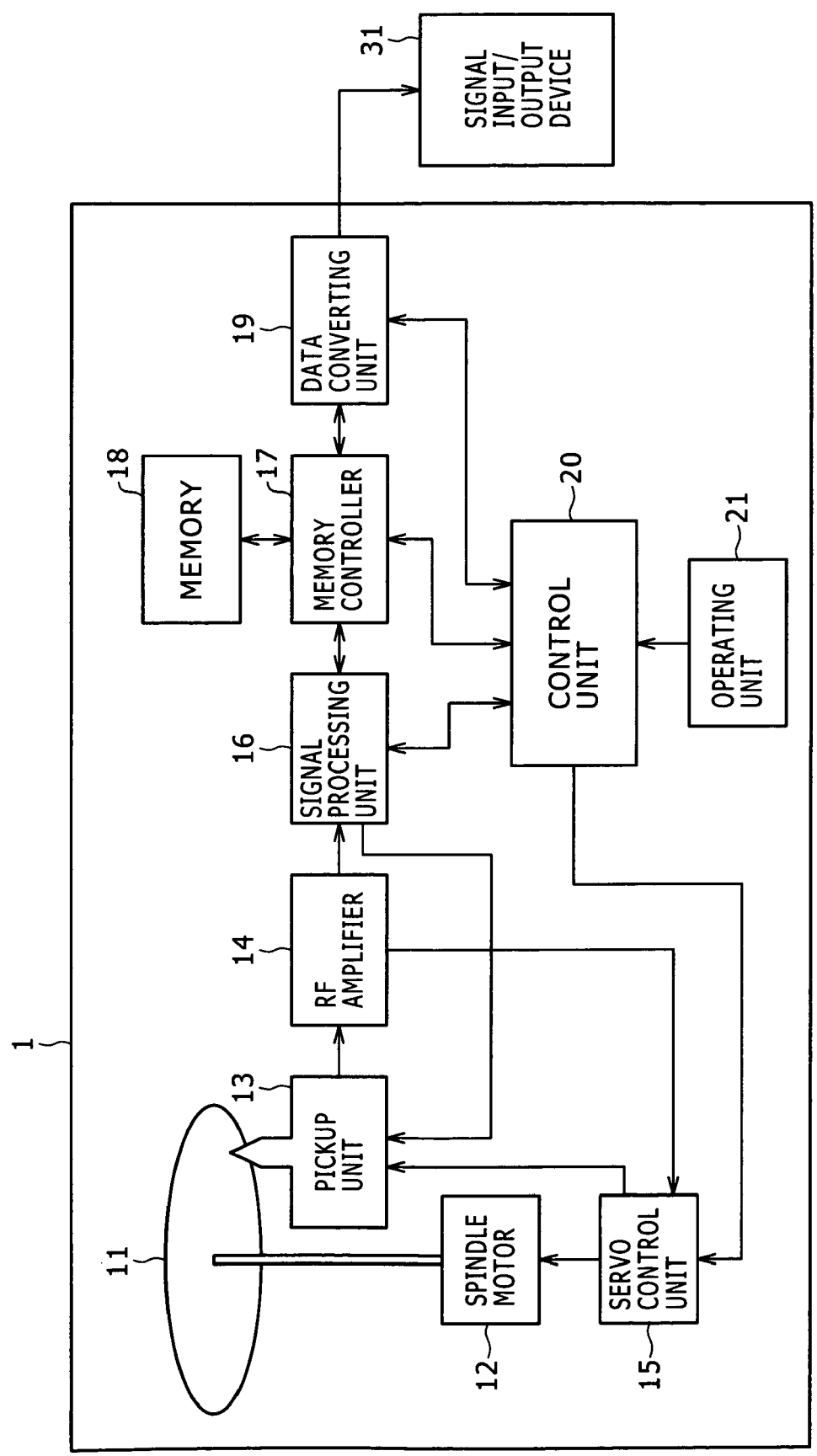
FIG. 1 is a diagram showing an example of configuration of a disk recording and reproducing device according to an embodiment of the present invention.

FIG. 1 shows an example of configuration of a disk recording and reproducing device as the best mode for carrying out the present invention (hereinafter referred to as an embodiment). The disk recording and reproducing device 1 includes a configuration of a recording control device according to an embodiment of the present invention. In addition, the disk recording and reproducing device 1, for example, has a function of an editing device for editing video and audio information including video information and audio information whose reproduction time is synchronized with that of the video information.

In FIG. 1, a spindle motor 12 rotates and drives an optical disk 11 on the basis of a spindle motor driving signal output from a servo control unit 15. The present embodiment adopts a CLV (Constant Linear Velocity) system as a disk rotation driving system. However, other systems including CAV, for example, may be adopted. Defect control based on an embodiment of the present invention to be described later is also applicable to and is useful for disk rotation driving systems other than CLV.

A pickup unit 13 records a signal onto the optical disk 11 by outputting laser light for recording on the basis of a recording signal supplied from a signal processing unit 16. In addition, the pickup unit 13 irradiates the optical disk 11 with laser light in such a manner as to focus the laser light on the optical disk 11, and subjects the reflected light from the optical disk 11 to photoelectric conversion to generate a current signal. The pickup unit 13 supplies the current signal to an RF (Radio Frequency) amplifier 14. Incidentally, the irradiation position of the laser light is controlled to a predetermined position by a servo control signal supplied from the servo control unit 15 to the pickup unit 13.

On the basis of the current signal from the pickup unit 13, the RF amplifier 14 generates a focus error signal, a tracking error signal, and a reproduced signal. The tracking error signal and the focus error signal are input to the servo control unit 15. The reproduced signal is input to the signal processing unit 16.

The servo control unit 15 performs servo control such as focus servo control, tracking servo control and the like. For example, the servo control unit 15 generates a focus servo control signal and a tracking servo control signal on the basis of the focus error signal and the tracking error signal input from the RF amplifier 14, and then outputs the focus servo control signal and the tracking servo control signal to an actuator (not shown) of the pickup unit 13. In addition, the servo control unit 15 performs spindle servo control for rotating the optical disk 11 at a predetermined rotational speed by generating a spindle motor driving signal for driving the spindle motor 12.

The disk recording and reproducing device 1 according to the present embodiment can perform recording and reproduction supporting, as the optical disk 11, a single-layer optical disk having one recording layer and a multiple-layer optical disk having a plurality of recording layers. Supporting such a multiple-layer optical disk, for example, the servo control unit 15 also performs control referred to as an interlayer jump for moving an access position between recording layers.

Further, the servo control unit 15 performs sled control for moving the irradiation position of the laser light by moving the pickup unit 13 itself in a direction of the radius of the optical disk 11.

Incidentally, a control unit 20 specifies a signal reading position (address) in reading a signal (data) from the optical disk 11. The irradiation position of the laser light with respect to the optical disk 11 is controlled, including the sled control for reading the signal from the specified reading position.

The signal processing unit 16 at a time of recording generates a recording signal by subjecting data for recording which data is input from a memory controller 17 to recording modulation, and then supplies the recording signal to the pickup unit 13. The signal processing unit 16 at a time of reproduction obtains reproduced data by performing demodulation processing on a reproduced signal from the RF amplifier 14, and then supplies the reproduced data to the memory controller 17.

The memory controller 17 writes recording data output from a data converting unit 19 to a memory 18 as appropriate to retain the recording data in the memory 18 temporarily, as will be described later, and reads the recording data and outputs the recording data to the signal processing unit 16. In addition, the memory controller 17 writes the reproduced data transferred from the signal processing unit 16 to the memory 18 as appropriate to retain the reproduced data in the memory 18 temporarily, and reads the reproduced data and outputs the reproduced data to the data converting unit 19.

The data converting unit 19 compression-codes video and audio information formed of a taken image and collected sound, the video and audio information being stored on a storage medium on the side of a video camera (not shown) by photographing and recording on the video camera and being input from a signal input-output device 31, or video and audio information reproduced from a storage medium (not shown) by another video device and input from the signal input-output device 31 according to a predetermined compression-coding format as required. The data converting unit 19 then transfers the compression-coded video and audio information to the memory controller 17.

The data converting unit 19 also converts reproduced video and audio data transferred from the memory controller 17 into a video and audio signal in a predetermined signal format by subjecting the reproduced video and audio data to decoding (decompression) processing corresponding to the compression coding as required. The data converting unit 19 then outputs the video and audio signal to the signal input-output device 31.

The control unit 20 controls the servo control unit 15, the signal processing unit 16, the memory controller 17, and the data converting unit 19 to perform recording and reproducing operation.

Incidentally, the control unit 20 has, for example, a configuration of a microcomputer. The control unit 20 thus includes a CPU (Central Processing Unit), a ROM (Read-Only Memory), a RAM (Random-Access Memory), and a storage device such as a flash memory or the like.

An operating unit 21 includes, for example, various operating elements provided on the main body of the disk recording and reproducing device 1 and an operating signal output unit for generating an operating signal corresponding to an operation performed on the operating elements and then outputting the operating signal to the control unit 20 (CPU). The various operating elements and the operating signal output unit are shown collectively as the optical element 21. The control unit 20 performs a necessary control process so that an operation in response to the input operating signal is performed.

A flow of a recording signal when a video and audio signal (data), for example, is recorded in the above-described configuration is as follows.

In this case, first, data for recording is input from the signal input-output device 31. A video and audio signal as the thus input data for recording is subjected to processing such, for example, as compression coding in the data converting unit 19, temporarily retained in the memory 18 by the memory controller 17, and thereafter read by the memory controller 17 to be output to the signal processing unit 16. The data for recording input to the signal processing unit 16 is subjected to recording modulation processing, and output as a recording signal to the pickup unit 13. The pickup unit 13 then performs laser light irradiation corresponding to the input recording signal, whereby data recording is performed on the optical disk 11.

At a time of reproduction, the pickup unit 13 reads a signal stored on the optical disk 11 as a current signal. This current signal is converted into a binarized reproduced signal by the RF amplifier 14. The binarized reproduced signal is subjected to demodulation processing as opposed to recording modulation in the signal processing unit 16, and then transferred as a reproduced signal data of video and audio to the memory controller 17. The memory controller 17 outputs the reproduced signal data transferred to the memory controller 17 to the data converting unit 19 via the memory 18. The reproduced signal data input to the data converting unit 19 is, for example, subjected to decompression processing as opposed to compression coding and converted into a video and audio signal in a predetermined format as required. The video and audio signal is then output to the signal input-output device 31.

The data recorded on the optical disk 11 and reproduced as described above is managed by a file system based on a predetermined method. The control unit 20 performs file system control according to a program.

Incidentally, the disk recording and reproducing device 1 according to the present embodiment may be configured to be able to record and reproduce other kinds of data than video and audio, including data of document files, for example.

In addition, the recording and reproducing device 1 according to the present embodiment can perform recording and reproduction supporting a multiple-layer optical disk conforming to a predetermined format as the optical disk 11 to be recorded and reproduced. A multiple-layer optical disk is formed by laminating two or more recording layers for recording data. A sectional view of FIG. 2 shows an example of laminated structure of a multiple-layer optical disk 11A supported by the present embodiment.

Figure 2:
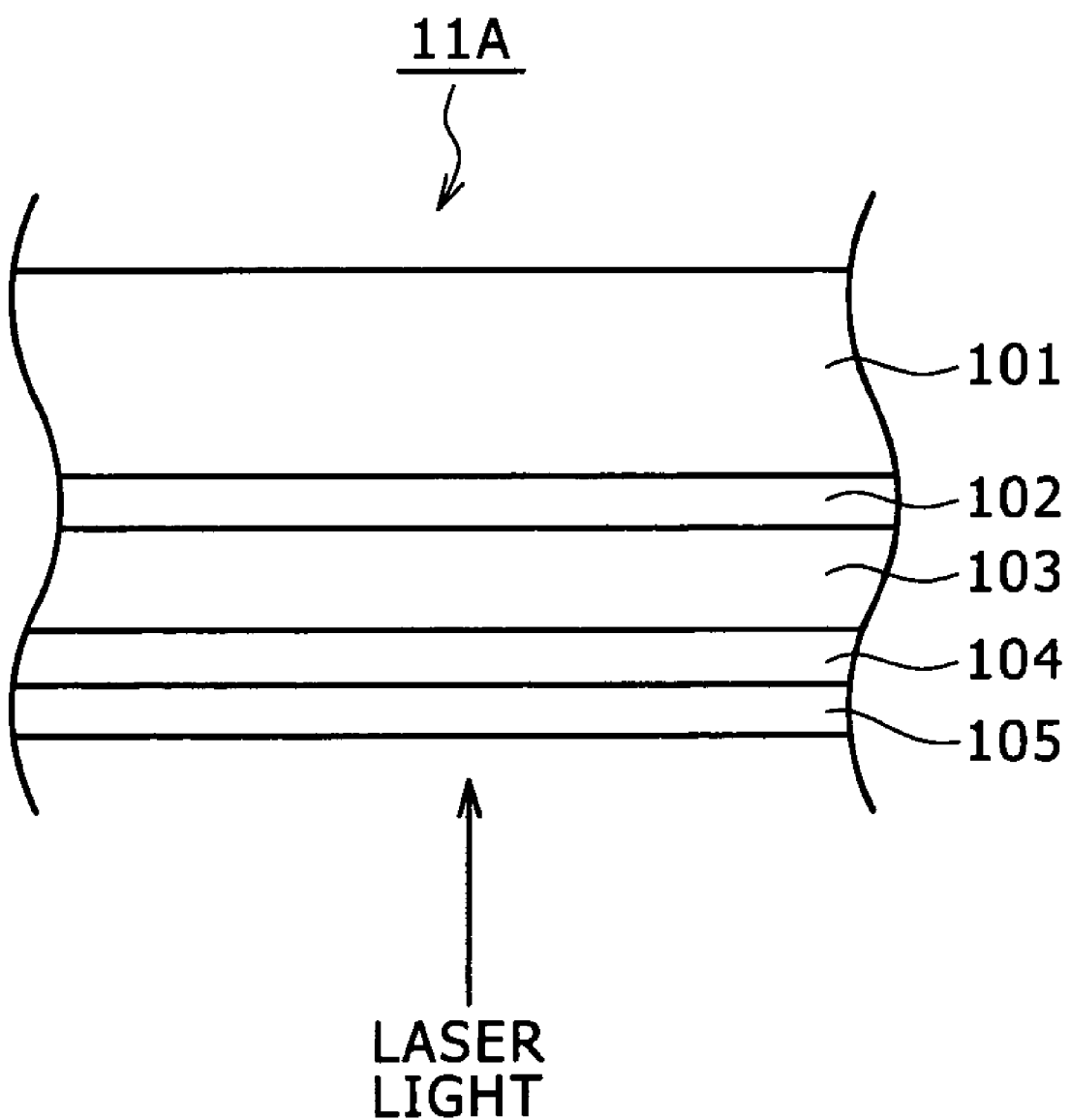
FIG. 2 is a sectional view of an example of layer structure of a multiple-layer optical disk supported by the disk recording and reproducing device according to the embodiment.

The multiple-layer optical disk 11A shown in FIG. 2 is formed such that a substrate layer 101, a rear recording layer (first recording layer) 102, a spacer layer 103, a front recording layer 104, and a cover layer 105 are laminated from the top to the bottom of the figure. At a time of manufacturing, a disk surface of a side formed by the substrate layer 101 and the rear recording layer 102 and a disk surface of a side formed by the front recording layer 104 and the cover layer 105 are laminated to the spacer layer 103, whereby the layer structure shown in the figure is obtained.

The above-described laminated structure has two layers where data is to be recorded, that is, the rear recording layer 102 and the front recording layer 104. Incidentally, it can be said that the rear recording layer 102 and the front recording layer 104 are in adjacent relation to each other as recording layers.

When recording or reproduction is performed on the multiple-layer optical disk 11A, laser light is applied from a direction shown in FIG. 2. The rear recording layer 102 and the front recording layer 104 form a rear side and a front side, respectively, with respect to the irradiation direction of the laser light.

Suppose that as the rear recording layer 102 and the front recording layer 104 in this case are of a rewritable type, for example, the rear recording layer 102 and the front recording layer 104 are formed as a film (phase change film) supporting a phase change system. Of course, when the rear recording layer 102 and the front recording layer 104 are of a write-once type, the rear recording layer 102 and the front recording layer 104 may be formed by a film supporting a dye change system, for example.

Though not shown in the figure, a track in each layer of the rear recording layer 102 and the front recording layer 104 is formed in a spiral shape in the layer surface. A groove-shaped part referred to as a groove and a land are formed alternately along the linear direction of the track. The multiple-layer optical disk 11A according to the present embodiment adopts a groove track system, in which data recording is performed with a groove as a track. Of course, a land track system in which data recording is performed with a land as a track may be adopted, or a land and groove track system in which data is recorded onto both a land and a groove may be adopted.

In the present embodiment, when sequential data recording is performed on the multiple-layer optical disk 11A, data is first recorded from the inner circumference to the outer circumference of the rear recording layer 102, and then data is recorded from the outer circumference to the inner circumference of the front recording layer 104. An algorithm for access and the like, including, for example, the setting of the spiral direction of the track and a physical address on the multiple-layer optical disk 11A and the setting of correspondence between a physical address and a logical address in the disk recording and reproducing device 1, is constructed to perform such sequential recording.

Tracking servo control can become unstable due to effect of a data recording state of a recording layer in an optical disk having a plurality of recording layers such as the multiple-layer optical disk 11A. This will be described with reference to FIGS. 8A to 10B.

Principles of generating a tracking error signal will first be described with reference to FIGS. 8A to 8E.

Figure 8A:
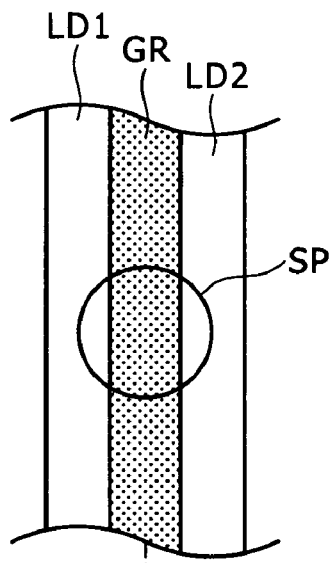
FIGS. 8A to 8E are diagrams showing principles of generating a tracking error signal.

FIG. 8A shows a track formed in the multiple-layer optical disk 11A in enlarged dimension. In this case, one groove GR and two adjacent lands LD1 and LD2 on both sides of the groove GR along the direction of the radius of the disk are shown.

When the groove track system as described above is adopted, the position of an objective lens in the direction of the radius of the disk is controlled by tracking servo control such that the laser spot SP of the laser light applied from the pickup unit 13 traces on the groove GR as shown in FIG. 8A.

In general, a land and a groove are different in optical reflectance. Suppose that in the case of FIG. 8A, the optical reflectance of the groove GR as a track is lower than that of the lands (LD1 and LD2).

Figure 8B:
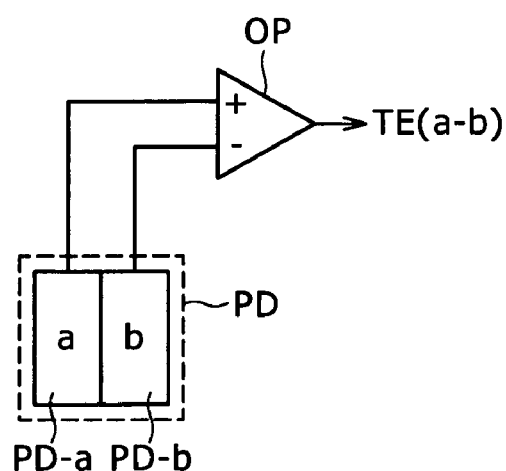

FIG. 8B shows a configuration for detecting a tracking error signal. The configuration in this case follows a push-pull method.

For the push-pull method, a reflected light detecting unit PD has two light detecting elements PD-a and PD-b divided so as to correspond to the linear direction of the track. The reflected light of the laser spot SP with which the signal surface of a recording layer is irradiated as shown in FIG. 8A is incident on the reflected light detecting unit PD having the light detecting elements PD-a and PD-b arranged therein. The light detecting elements PD-a and PD-b each output a detection signal at a level corresponding to an amount of light received. Incidentally, the light detecting elements and the reflected light detecting unit formed by the light detecting elements are referred to also as a photodetector or the like. Letting a and b be the detection signals output from the respective light detecting elements PD-a and PD-b, an arithmetic unit OP performs an operation expressed by a-b. An output of the arithmetic unit OP is a tracking error signal (TE).

Figure 8C:
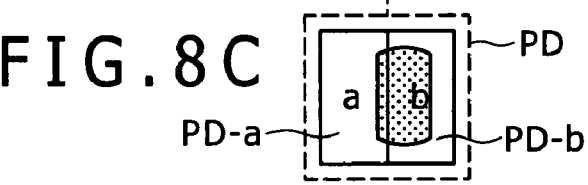
Figure 8D:
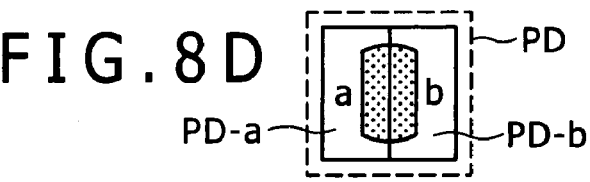

For example, when the position of the laser spot SP shown in FIG. 8A traces the groove GR in a best tracking state, the reflected light of the laser spot SP is incident on the light detecting elements PD-a and PD-b of the reflected light detecting unit PD as shown in FIG. 8D. Incidentally, in FIG. 8D (as is also applicable to FIGS. 8C and 8E), a part in substantially the shape of a barrel within the reflected light detecting unit PD is a dark part, and the other part is a bright part brighter than the dark part. In the state of FIG. 8D, the light detecting elements PD-a and PD-b receive a same amount of light, and thus the tracking error signal TE expressed by a-b is zero.

On the other hand, when the position of the laser spot SP shown in FIG. 8A deviates to the side of the land LD2 on the left side of the figure, the reflected light is incident on the light detecting elements PD-a and PD-b as shown in FIG. 8C. In this state, the light detecting element PD-a receives a larger amount of light than the light detecting element PD-b. Thus the tracking error signal is a positive value having an absolute value corresponding to a difference between the amounts of light.

Figure 8E:
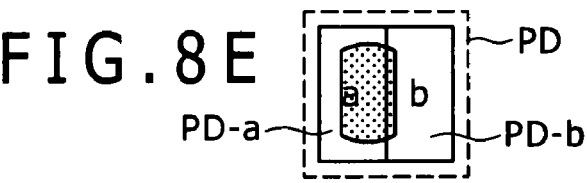

When the position of the laser spot SP shown in FIG. 8A deviates to the side of the land LD1 on the right side of the figure, the reflected light is incident on the light detecting elements PD-a and PD-b as shown in FIG. 8E. In this state, the light detecting element PD-b receives a larger amount of light than the light detecting element PD-a. Thus the tracking error signal is a negative value having an absolute value corresponding to a difference between the amounts of light.

Figure 9:
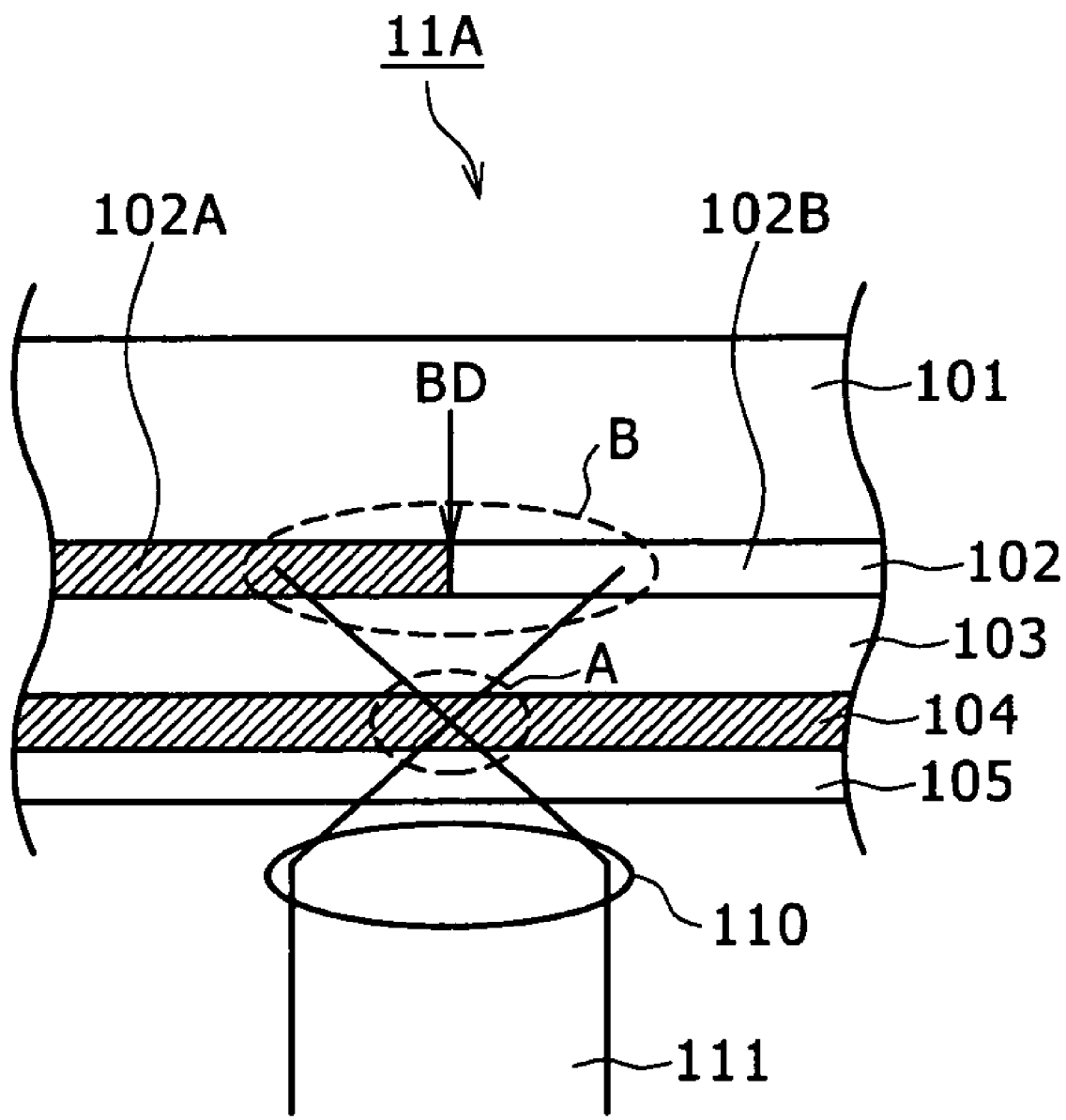
FIG. 9 is a diagram of assistance in explaining principles of occurrence of an offset of the tracking error signal which offset is caused by the formation of a boundary between a recorded area and an unrecorded area in the multiple-layer optical disk.

FIG. 9 shows the multiple-layer optical disk 11A corresponding to the present embodiment.

In this case, laser light 111 emitted from an objective lens 110 of the pickup unit 13 is shown focused on the front recording layer 104 side.

Figure 10A:
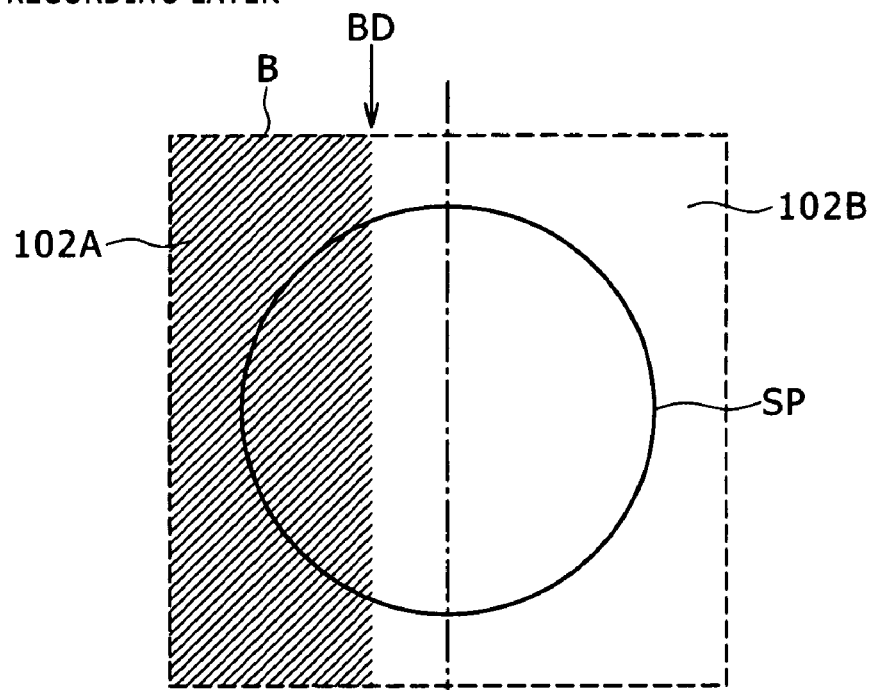
FIGS. 10A and 10B, together with FIG. 9, are diagrams of assistance in explaining the principles of occurrence of an offset of the tracking error signal which offset is caused by the formation of a boundary between a recorded area and an unrecorded area in the multiple-layer optical disk.
Figure 10B:
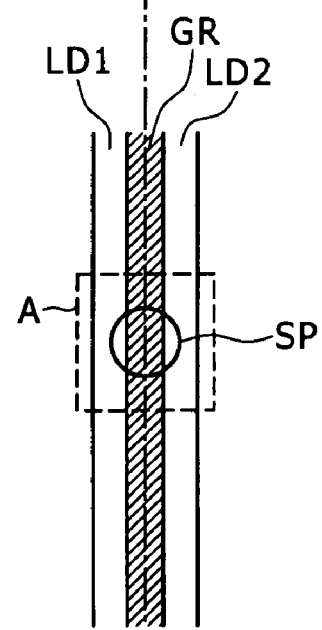

FIG. 10A is a diagram of a broken line part B shown in FIG. 9 described above as viewed in enlarged dimension from the side of a disk surface. FIG. 10B is a diagram of a broken line part A shown in FIG. 9 described above as viewed in enlarged dimension from the side of the same disk surface.

FIGS. 9 and 10A show a state in which an end part of a recorded data area 102A in which data is already recorded is in contact with an end part of an unrecorded area 102B in which no data is recorded in the rear recording layer 102. As is understood from FIG. 9, a boundary BD between the end parts in the rear recording layer 102 is present at a position substantially corresponding to the focused position of the laser light in the front recording layer 104 in a direction orthogonal to the disk surface (a direction along the axis of rotation of the disk). That is, the front recording layer 104, rather than the rear recording layer 102, is accessed at this time.

In such a state, the laser light 111 (laser spot SP) applied so as to be focused in the front recording layer 104 passes through this front recording layer 104 and the spacer layer 103. Thus, as shown as the broken line part B in FIG. 9, the laser light 111 is applied to the rear recording layer 102 in an unfocused state. In this state, as is also shown in FIG. 10A, the laser spot SP formed in the rear recording layer 102 is significantly larger than the laser spot SP in a focused state which laser spot is formed in FIG. 10B.

For example, when the rear recording layer 102 is formed by a phase change film, the film is in a crystalline state in the unrecorded area 102B, whereas the film is in an amorphous state in the recorded area 102A. The optical reflectance of the recorded area 102A is correspondingly lower than that of the unrecorded area 102B. Then, the reflected light itself of the laser spot SP with which the rear recording layer 102 is irradiated, for example, already has a difference in brightness according to the recorded area 102A and the unrecorded area 102B.

In the state of FIGS. 9 to 10B, to detect a tracking error signal, the reflected light detecting unit PD needs only reflected light based on the laser light applied to the front recording layer 104. In actuality, however, the laser light applied to the rear recording layer 102 can also be incident on the reflected light detecting unit PD as so-called stray light.

Then, in addition to the original reflected light from the front recording layer 104, the reflected light from the rear recording layer 102 which reflected light has the above-described difference in brightness is incident on the reflected light detecting unit PD. Because of the difference in brightness of the reflected light from the rear recording layer 102, in actuality, for example, the tracking error signal is not zero and an offset occurs even in a proper tracking state. Thereby, tracking servo control at a time of recording or reproduction may become unstable, which presents a problem.

One cause for the formation of the boundary BD between the recorded area and the unrecorded area as shown in FIGS. 9 and 10A is, for example, defect control at a time of recording.

The defect control detects an area where data cannot be written or read due to a flaw in the disk surface, for example, as a defect area, and prevents data recording from being performed in the defect area.

Then, because the defect area is an unrecorded area, a boundary between a recorded area and the unrecorded area is formed so as to correspond to a start position and an end position of the defect area.

The present embodiment adopts a configuration of new defect control for preventing an offset of the tracking error signal which offset has, as a factor thereof, a boundary between a recorded area and an unrecorded area which boundary is formed by the defect area as described above. This point will be described in the following.

Figure 3:
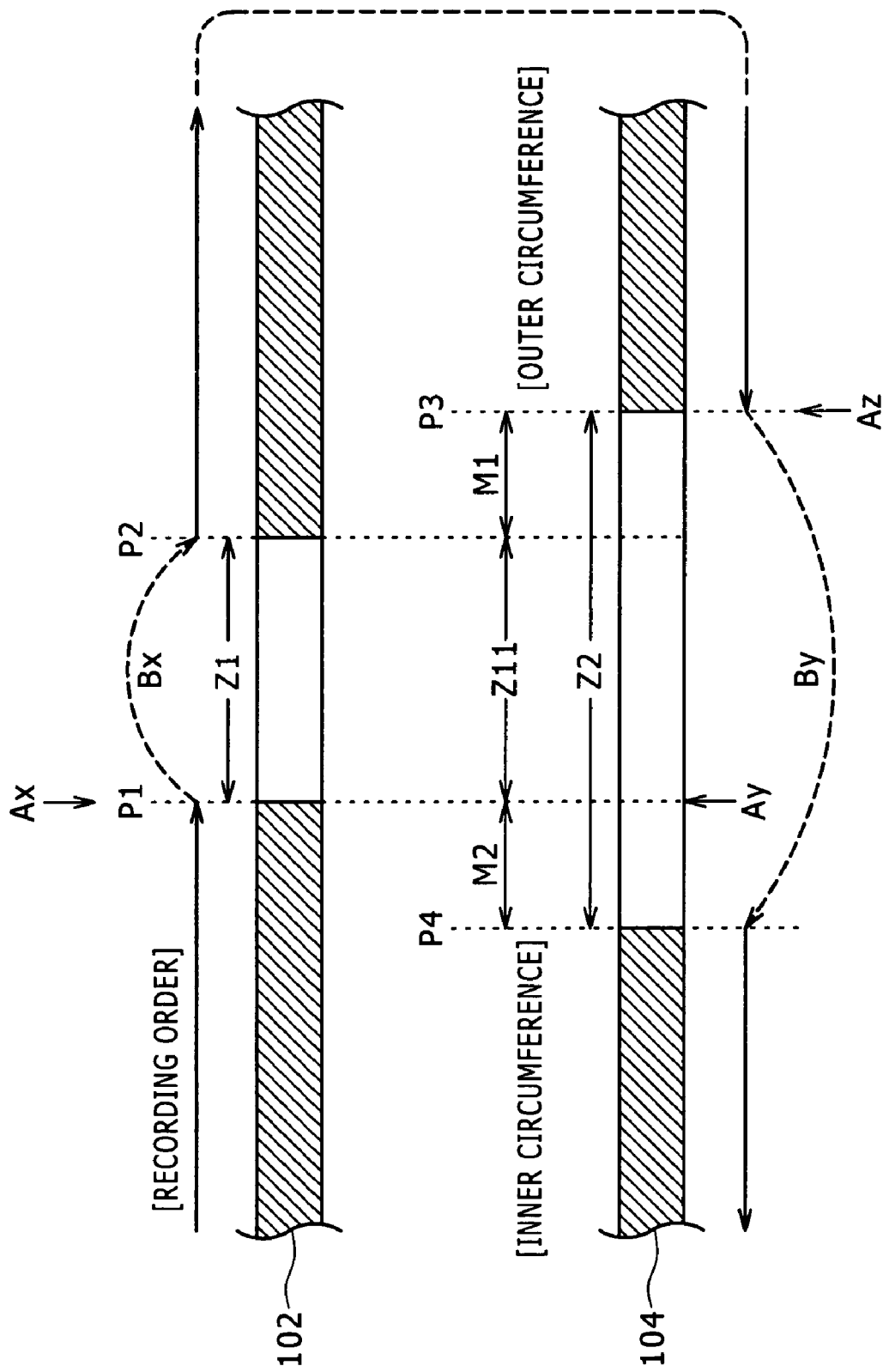
FIG. 3 is a diagram showing an example of operation of defect control according to the embodiment.

FIG. 3 schematically shows an example of operation of defect control according to the present embodiment.

As described above, when the disk recording and reproducing device 1 according to the present embodiment performs sequential recording on the multiple-layer optical disk 11A, the disk recording and reproducing device 1 records data from the inner circumference side to the outer circumference side of the rear recording layer 102, and next records data from the outer circumference side to the inner circumference side of the front recording layer 104.

Recording order shown in FIG. 3 is in accordance with the above-described sequential recording. Suppose that in a process of recording data in the rear recording layer 102, it is detected that a continuous area or section from position (for example, an address) P1 to position P2 of the recording layer is a defect area. Incidentally, for the detection, range setting and the like for a defect area in the present embodiment, it suffices to adopt, for example, hitherto known techniques and systems or techniques and systems to be put to practical use in the future.

The area from position P1 to position P2 is a real defect area actually set as a defect area. Such a real defect area is registered as a defect area by control related to DMA (Defect Management Area).

The real defect area detected in this case belongs to the rear recording layer 102. In the present embodiment, when a real defect area is thus detected in a recording layer of a plurality of recording layers in which layer data recording is performed first, a pseudo defect area corresponding to the real defect area is set in a recording layer in which data recording is performed next, that is, the front recording layer 104, as will be described below.

A real defect area Z1 in FIG. 3 is a range from position P1 to position P2. A pseudo defect area Z2 corresponding to the real defect area Z1 is shown in the figure. Specifically, the pseudo defect area Z2 in the front recording layer 104 includes: an area Z11 (corresponding area) having a corresponding physical positional relation to the real defect area Z1; a margin area m1 formed by an area up to position P3 preceding a start position (P2) of the area Z11; and a margin area M2 formed by an area up to position P4 succeeding an end position (P1) of the area Z11.

That is, the pseudo defect area is formed including the physical area range corresponding to the corresponding real defect area, with a predetermined margin provided in front and in the rear of the physical area range.

In defect control according to the present embodiment, the thus set pseudo defect area is also registered as a defect area as with the real defect area.

The disk recording and reproducing device 1 does not access an area registered as a defect area (registered defect area), but records data in the rear of an end position of the registered defect area. That is, as access operation at a time of recording, the registered defect area is skipped (this operation will hereinafter be referred to also as a defect skip).

In the case of FIG. 3, when the disk recording and reproducing device 1 first records data in the rear recording layer 102, the disk recording and reproducing device 1 performs data recording up to a position immediately preceding position P1 corresponding to the start position of the real defect area Z1, performs a defect skip by jumping over position P2 corresponding to the end position of the real defect area Z1, and resumes data recording from a position (address) following position P2.

Suppose that by continuing the data recording as sequential recording, the disk recording and reproducing device 1 completes the data recording up to a position corresponding to an outermost circumference in a data recordable area of the rear recording layer 102, and starts data recording from a position corresponding to an outermost circumference of the front recording layer 104. In this case, in the front recording layer 104, the disk recording and reproducing device 1 performs data recording up to a position immediately preceding the start position P3 of the pseudo defect area Z2, performs a defect skip to the end position P4 of the pseudo defect area Z2, and performs data recording from a position (address) following position P4.

Because data recording is performed with defect control as described above, as shown in FIG. 3, boundaries (positions P1 and P2) between recorded areas and the unrecorded area which boundaries are formed in correspondence with the real defect area Z1 are surely included within the pseudo defect area Z2 in physical positional relation to the side of the front recording layer 104. Further, the width (convertible into address width, the number of tracks, or the like) of the two margin areas M1 and M2 forming the pseudo defect area Z2 is set at least such that when the front recording layer 104 corresponding to positions P3 and P4 is irradiated with the laser spot SP in a focused state, the real defect area Z1 is not irradiated with the laser spot SP, which is applied in an unfocused state in the rear recording layer 102.

Incidentally, in setting the width (margin width) of the margin areas M1 and M2, consideration is given to at least the size of the laser spot SP applied in the unfocused state in the rear recording layer 102. Further, as will be described later, consideration is given to an error of relation in physical address (track) position between the rear recording layer 102 and the front recording layer 104, the error being attributable to a shift in the direction of the radius of the disk when the rear recording layer 102 side and the front recording layer 104 side are laminated to each other.

With the above-described configuration, even in a state in which the laser spot SP reaches the vicinity of position P3 corresponding to the start position of the pseudo defect area Z2 while the front recording layer 104 is accessed and data recording is performed, only the recorded area succeeding the real defect area Z1 is irradiated with the laser spot SP that reaches the rear recording layer 102. At this time, the reflected light does not have a difference in brightness. Similarly, even in a state in which the laser spot SP in the focused state in the front recording layer 104 is in the vicinity of position P3 corresponding to the start position of the pseudo defect area Z2, only the recorded area preceding the real defect area Z1 is irradiated with the laser spot SP that reaches the rear recording layer 102, and the reflected light does not have a difference in brightness. Because a defect skip is performed for the pseudo defect area Z2, the pseudo defect area Z2 is not accessed at the time of recording (reproduction). Therefore, the laser spot SP in the unfocused state does not fall on the boundaries corresponding to positions P1 and P2 of the rear recording layer 102 (that is, the boundaries between the real defect area Z1 and the recorded areas preceding and succeeding the real defect area Z1).

By thus setting the pseudo defect area, the present embodiment avoids the occurrence of an offset of the tracking error signal due to the presence of the boundaries between the real defect area and the recorded areas preceding and succeeding the real defect area. Thereby stable tracking servo control can be obtained irrespective of the presence of defect areas.

Figure 4:
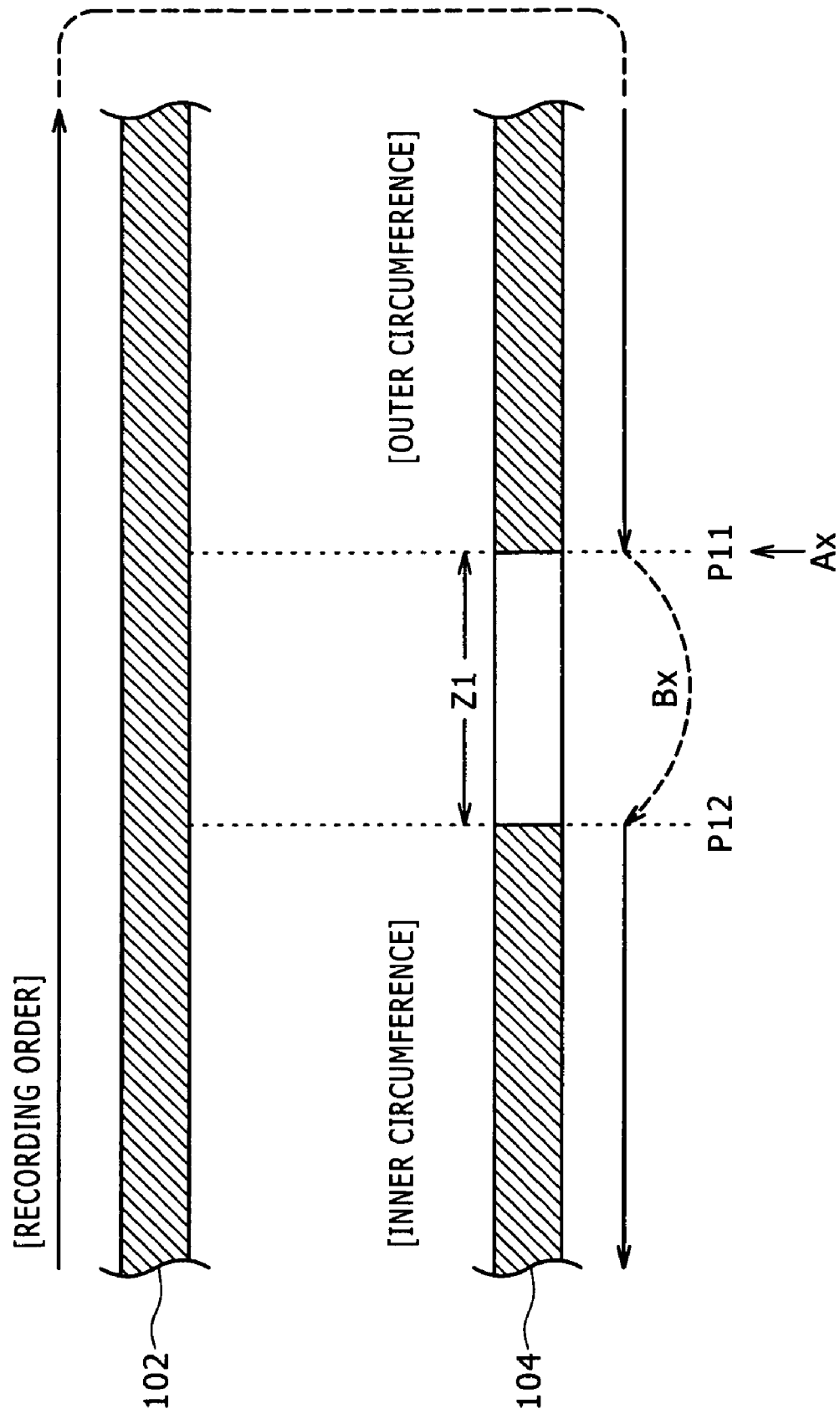
FIG. 4 is a diagram showing another example of operation of defect control according to the embodiment.

FIG. 4 shows another example of defect control according to the present embodiment.

FIG. 4 shows a state in which an area from position P11 to position P12 is detected as a real defect area Z1 while data recording is performed in the front recording layer 104 after data recording in the rear recording layer 102 is ended in a process of sequential recording being performed.

When a real defect area is thus detected in the front recording layer 104, a pseudo defect area Z2 as shown in FIG. 3 is not set in the other rear recording layer 102. When sequential recording is performed, data is already recorded in the rear recording layer 102 in a stage where data recording is performed in the front recording layer 104. Thus, a difference in brightness does not occur in the reflected light of the unfocused laser spot SP passing through the front recording layer 104 in the vicinity of the real defect area Z1 and applied to the rear recording layer 102.

Figure 5:
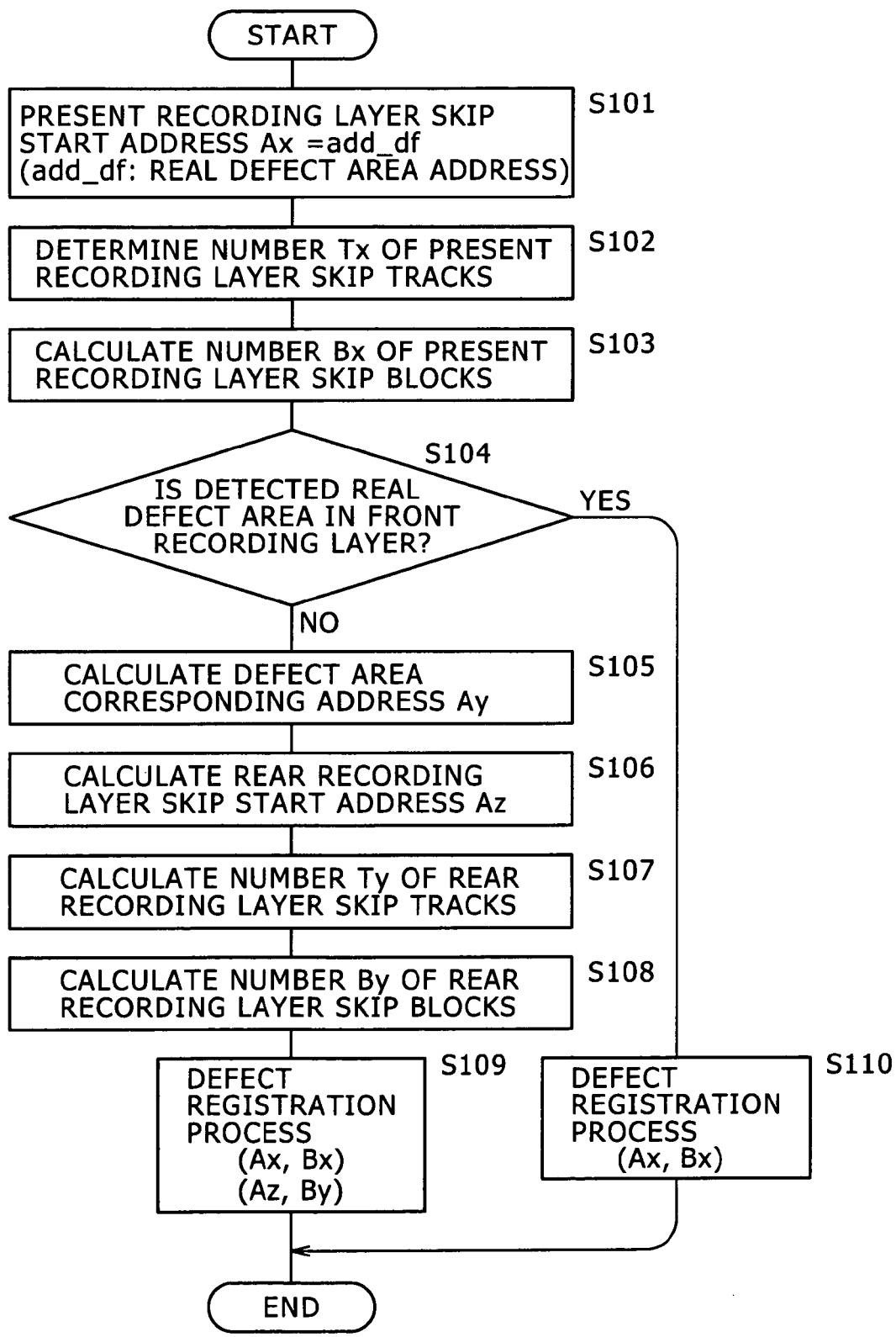
FIG. 5 is a flowchart of a procedure performed by the disk recording and reproducing device for defect control according to the embodiment.

FIG. 5 is a flowchart of an example of a procedure performed by the disk recording and reproducing device 1 for the defect control according to the present embodiment described with reference to FIGS. 3 and 4. Incidentally, in description below, the following function is defined.

$$B\_per\_T(r) \quad \text{[Equation 1]}$$

The above (Equation 1) is a function for obtaining the number of ECC blocks recorded per round of a track whose radial position in the multiple-layer optical disk 11A is r (unit: m (meter)). Data recorded on the multiple-layer optical disk 11A according to the present embodiment can be regarded as a sequence of ECC block units. In the present embodiment, a CLV system is adopted, and thus the number of ECC blocks recorded in one round of a track differs according to the radial position of the track. Thus, there arises a need to determine the number of ECC blocks according to the radial position.

$$A\text{rear\_to\_R}(A) \quad \text{[Equation 2]}$$

The above (Equation 2) is a function for obtaining the radial position of an ECC block indicated by an address A in the rear recording layer 102.

$$R\_to\_A\text{front}(r) \quad \text{[Equation 3]}$$

The above (Equation 3) is a function for obtaining the address of an ECC block whose radial position in the front recording layer 104 is r (m).

In addition, the functions shown as the above (Equation 1), (Equation 2), and (Equation 3) are respectively expressed as (Equation 4), (Equation 5), and (Equation 6) below.

$$B\_per\_T(r)=2\cdot\pi\cdot r/L \quad \text{[Equation 4]}$$

L: recording length (m) per ECC block in CLV $$A\text{rear\_to\_}R(A)=Sqrt((Rout^2-Rin^2)\cdot A/N+Rin^2) \quad \text{[Equation 5]}$$

Sqrt(x): a function for obtaining the square root of x
Rin: the radial position (m) of an innermost circumference
Rout: the radial position (m) of an outermost circumference
N: the number of ECC blocks per recording layer $$R\_to\_A\text{front}(R)=(2-(R^2-Rin^2)/(Rout^2-Rin^2))\cdot N \quad \text{[Equation 6]}$$

The disk recording and reproducing device 1 performs data recording on the multiple-layer optical disk 11, and detects a real defect area in relation to an area where the data recording is to be performed. When detecting a real defect area, the disk recording and reproducing device 1 is to perform the procedure from step S101 on down in FIG. 5.

In step S101, the value of a real defect area address add_df is assigned to a present recording layer skip start address Ax (Ax=add_df). The present recording layer skip start address Ax represents an address where a defect skip is to be started in a recording layer in which data recording is now being performed (present recording layer). The real defect area address add_df is an address indicating the position of a real defect area detected at this time. Suppose in this case that the real defect area address add_df is an address corresponding to the start position of the detected real defect area.

As a result of this process, as for correspondence with FIG. 3, an address indicating position P1 corresponding to the start position of the real defect area Z1 in the rear recording layer 102 is set as the present recording layer skip start address Ax. As for correspondence with FIG. 4, an address indicating position P11 corresponding to the start position of the real defect area Z1 in the front recording layer 104 is set as the present recording layer skip start address Ax.

In step S102, the number Tx of present recording layer skip tracks is determined.

The number Tx of present recording layer skip tracks represents, by the number of tracks, a range to be skipped with the present recording layer skip start address Ax as a starting point in performing a defect skip in the present recording layer. In other words, the range (end position) of the real defect area with the present recording layer skip start address Ax as a starting point is indicated by the number of tracks.

There are a few methods considered as to how to determine the number Tx of present recording layer skip tracks, that is, the range and width of the real defect area. For example, adoption of a method is considered which method sets the number of tracks by applying a technique of setting address width to be changed according to the size of a defect, the technique being described in Japanese Patent No. 3953036 of the present applicant.

In step S103, the number Bx of present recording layer skip blocks is determined.

The number Bx of present recording layer skip blocks represents, by the number of ECC blocks, a range to be skipped with the present recording layer skip start address Ax as a starting point in performing a defect skip in the present recording layer. The range (end position) of the real defect area with the present recording layer skip start address Ax as a starting point is indicated by the number of ECC blocks. As a result of this process, as for correspondence with FIGS. 3 and 4, the end position P2 or P12 of the real defect area Z1 is identified.

The number Bx of present recording layer skip blocks is calculated by the following equation, for example.

$$Bx = B\_per\_T(Arear\_to\_R(Ax)) \cdot Tx \qquad \text{[Equation 7]}$$

In step S104, whether the real defect area detected at this time has been detected in the front recording layer is determined. For this, it suffices to determine whether the address set in step S101 is included in an address range corresponding to the rear recording layer 102 or in an address range corresponding to the front recording layer 104.

When a negative determination result is obtained in step S104, this means that the real defect area has been detected in the rear recording layer 102. In this case, a procedure from step S105 on down is performed.

In step S105, a defect area corresponding address Ay is calculated.

As is also shown in FIG. 3, for example, the defect area corresponding address Ay is an address on the front recording layer 104 side which address corresponds to the start position of the detected real defect area (present recording layer skip start address Ax) in physical positional relation. This defect area corresponding address Ay can be obtained by the following equation.

$$Ay = R\_to\_Afront(Arear\_to\_R(Ax)) \qquad \text{[Equation 8]}$$

In step S106, a rear recording layer skip start address Az is calculated.

The rear recording layer skip start address Az is an address corresponding to the start position of the pseudo defect area. As for correspondence with FIG. 3, the rear recording layer skip start address Az is an address corresponding to the start position (P3) of the margin section M1.

The rear recording layer skip start address Az can be obtained by the following equation.

$$Az = R\_to\_Afront(Arear\_to\_R(Ax) + Tx \cdot P + M). \qquad \text{[Equation 9]}$$

P: track pitch (m)
M: margin (m)

In step S107, the number Ty of rear recording layer skip tracks is calculated.

The number Ty of rear recording layer skip tracks represents, by the number of tracks, a range to be skipped with the rear recording layer skip start address Az as a starting point in performing a defect skip corresponding to the pseudo defect area in the rear recording layer. In addition, the number Ty of rear recording layer skip tracks represents the range (end position) of the pseudo defect area with the rear recording layer skip start address Az as a starting point by the number of tracks.

The number Ty of rear recording layer skip tracks can be obtained by the following equation.

$$Ty = Tx + 2 \cdot M/P \qquad \text{[Equation 10]}$$

In step S108, the number By of rear recording layer skip blocks is calculated.

The number By of rear recording layer skip blocks represents, by the number of blocks, a range to be skipped with the rear recording layer skip start address Az as a starting point in performing a defect skip corresponding to the pseudo defect area in the rear recording layer. In addition, the range (end position) of the pseudo defect area with the rear recording layer skip start address Az as a starting point is indicated by the number. By of blocks.

The number By of rear recording layer skip blocks can be obtained by the following equation.

$$By = Bx \cdot Ty/Tx \qquad \text{[Equation 11]}$$

In step S109, the real defect area detected this time and the pseudo defect area set according to the procedure of steps S105 to S108 are registered as defect areas. In this case, (Ax, Bx) is registered for the real defect area, and (Az, By) is registered for the pseudo defect area.

That is, in this case, one defect area is registered by registering a skip start address and the number of skip blocks. When reference can be made to the skip start address and the number of skip blocks, a position at which to start a defect skip and the amount of the skip can be determined, and thus the defect skip can be performed normally. In addition, the skip start address and the number of skip blocks can determine not only the start position (skip start address) of the defect area but also the end position of the defect area, that is, determine where the defect area is present.

When a positive determination result is obtained in previous step S104, the pseudo defect area does not need to be set or registered, as has been described with reference to FIG. 4. Accordingly, in this case, only the real defect area detected at this time is registered in step S110. That is, (Ax, Bx) is registered.

Incidentally, processing and control as the procedure shown in FIG. 5 described above can be regarded as processing and control performed by the control unit 20 in the disk recording and reproducing device 1. The operation of the control unit 20 is obtained by the execution of a program by the internal CPU. Such a program may be written and stored in a ROM, for example, at the time of manufacturing or the like, or may be stored on a removable storage medium and then stored in a nonvolatile storage area within the microcomputer included in the control unit 20 by being installed (including an update) from the storage medium. In addition, the program may be able to be installed by control from a device as another host via a data interface such as USB, IEEE 1394 or the like. Further, the program may be stored in a storage device in a server on a network or the like, and the disk recording and reproducing device 1 may be provided with a network function to download and obtain the program from the server.

Figure 6:
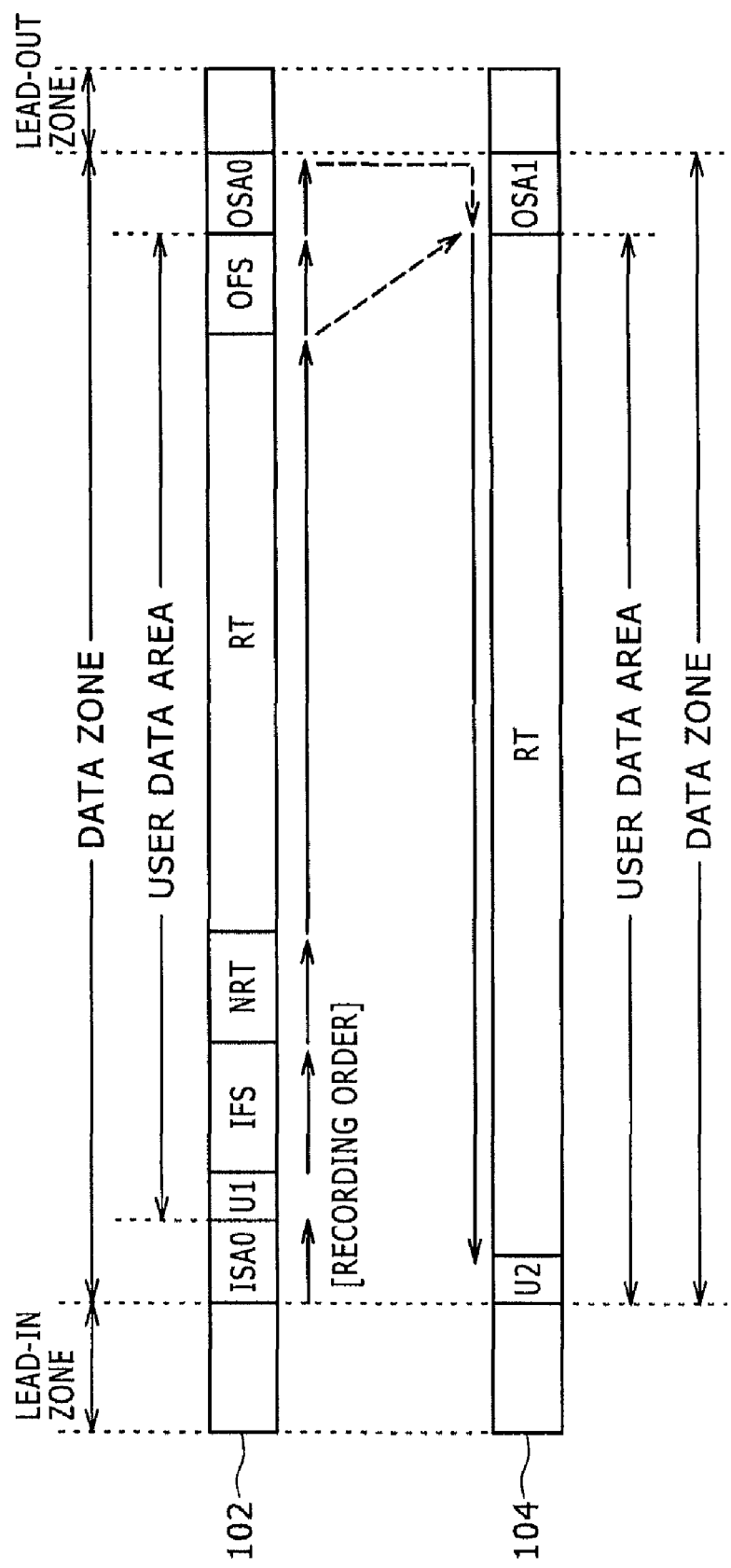
FIG. 6 is a diagram showing an example of arrangement of areas of the multiple-layer optical disk corresponding to the embodiment.
Figure 7A:
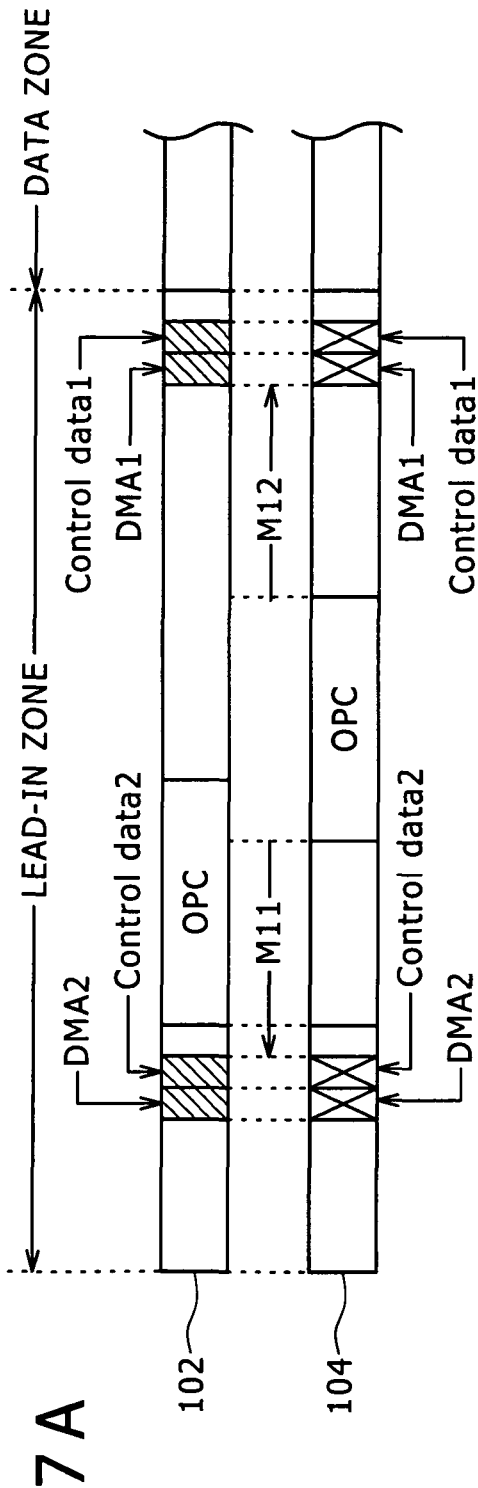
FIGS. 7A and 7B are diagrams showing an example of arrangement of areas in a lead-in zone and a lead-out zone of the multiple-layer optical disk corresponding to the embodiment.
Figure 7B:
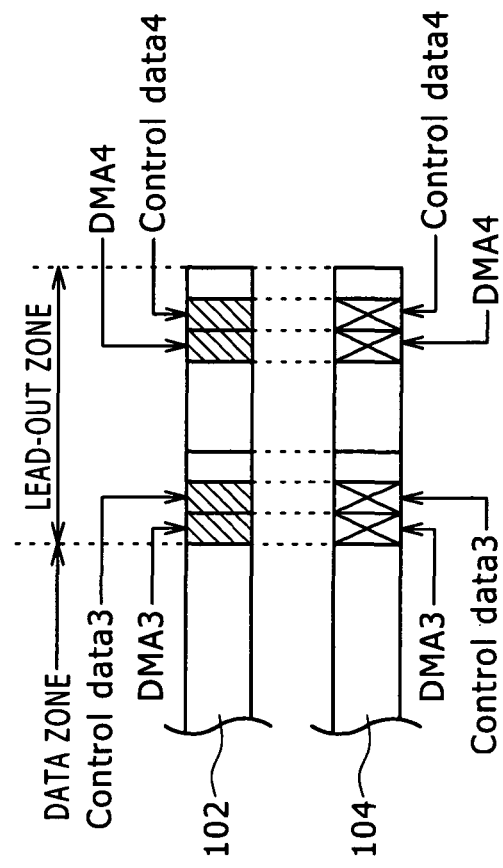

FIGS. 6 to 7B show a layout structure of areas within the disk which layout structure is adopted by the multiple-layer optical disk 11A according to the present embodiment.

Description will first be made of the rear recording layer 102.

The rear recording layer 102 has a lead-in zone, a data zone, and a lead-out zone arranged therein from an inner circumference side to an outer circumference side. The data zone includes ISA0 (Inner Spare Area) at an innermost circumference, OSA0 (Outer Spare Area) at an outermost circumference, and a user data area between ISA0 and OSA0. The ISA (Inner Spare Area) and OSA0 (Outer Spare Area) areas are to be used in a replacement process performed in response to the detection of a defect, and are referred to also as replacement areas. The user data area has a UDF1 (U1), an IFS, an NRT, an RT, and an OFS area arranged therein from the inner circumference side to the outer circumference side.

Volume information concerning the present disk in conformity with UDF (Universal Disk Format) is recorded in UDF1. Management information concerning a file recorded on the present disk in conformity with a predetermined file system is recorded in each of IFS (Inner File System) and OFS (Outer File System). Effective user data including information such, for example, as video and audio is recorded in RT (Real Time metadata). Additional information of predetermined contents accompanying the data recorded in RT is recorded in NRT (Non-Real Time metadata).

The front recording layer 104 has a lead-in zone, a data zone, and a lead-out zone arranged therein from the inner circumference side to the outer circumference side so as to correspond to the layout of the rear recording layer 102. The data zone has a user data area and OSA1 arranged therein from the inner circumference side to the outer circumference side. The user data area includes UDF2 (U2) on the inner circumference side and RT on the outer circumference side.

When the disk recording and reproducing device 1 according to the present embodiment performs sequential recording on the multiple-layer optical disk 11A of the above-described structure, the disk recording and reproducing device 1 performs data recording in [recording order] indicated by arrows in FIG. 6, for example.

FIGS. 7A and 7B show an example of area settings within the lead-in zone and the lead-out zone shown in FIG. 6 described above.

FIG. 7A shows the lead-in zone.

First, the lead-in zone in the rear recording layer 102 has respective areas (control and management information areas) of DMA2, Control Data2, OPC, DMA1, and Control Data1 set therein from the inner circumference side. The lead-in zone in the front recording layer 104 has the same areas of DMA2, Control Data2, OPC, DMA1, and Control Data1 set therein.

DMA (Defect Management Area, Disc Management Area) 2 and DMA1 are areas that can be used for management of defect areas. Registration information on a defect area (defect registration information) which information is obtained by the defect registration process (step S109 or S110 in FIG. 5) according to the present embodiment described earlier is recorded in a predetermined format in these DMA areas.

Control Data2 and Control Data1 have various control information recorded therein, the control information including a disk type, a disk size, a disk version, layer structure, recording linear velocity, recording/reproduction laser power information and the like. OPC (Optimum Power Control Area) is an area (primary data recording area) used to perform data recording temporarily for adjustment of recording and reproduction conditions, such as trial writing at a time of setting the data recording and reproduction conditions such as laser power at the time of recording/reproduction and the like.

FIG. 7B shows the lead-out zone.

The lead-out zone in the rear recording layer 102 has DMA3, Control Data3, DMA4 and Control Data4 arranged at positions shown in FIG. 7B. The lead-out zone in the front recording layer 104 similarly has respective areas of DMA3, Control Data3, DMA4 and Control Data4 arranged therein.

Incidentally, as shown in FIGS. 7A and 7B, DMA (DMA1, DMA2, DMA3 and DMA4) and Control Data (Control Data1, Control Data2, Control Data3 and Control Data4) in the rear recording layer 102 and DMA (DMA1, DMA2, DMA3 and DMA4) and Control Data (Control Data1, Control Data2, Control Data3 and Control Data4) in the front recording layer 104 are respectively arranged so as to correspond to each other in physical positional relation to each other.

In the present embodiment, of these areas shown in FIGS. 7A and 7B, as for at least the DMA (DMA1, DMA2, DMA3 and DMA4) areas, only the areas in the rear recording layer 102 are actually used, and these areas on the front recording layer 104 side are not used. This is pursuant to defect control according to the present embodiment.

As described above, defect registration information is recorded in DMA (DMA1, DMA2, DMA3 and DMA4). Supposing sequential recording, data recording starts in the rear recording layer 102. Then, considering a possibility of the recording being ended in the rear recording layer 102, it is desirable in terms of efficiency of recording control and the like that defect registration information detected in the rear recording layer 102 be first recorded in DMA in the same rear recording layer 102. On the basis of this, in the present embodiment, as for the use of DMA, recording into DMA on the rear recording layer 102 side is made essential.

However, because the size of defect registration information is small as compared with the size of a DMA, when a DMA is used by recording defect registration information in the DMA, a boundary between a recorded area and an unrecorded area is formed in the DMA. For example, under this condition, when in response to data recording performed in the front recording layer 104, defect registration information reflecting a result of defect area detection at this time is to be recorded in DMA in the front recording layer 104, there arises a possibility of an offset of the tracking error signal occurring as described earlier with reference to FIGS. 9 to 10B.

Accordingly, in the present embodiment, DMA in the front recording layer 104 is not used. That is, defect registration information detected in the front recording layer 104 is also recorded in DMA in the rear recording layer 102. Thereby, the DMA areas of the front recording layer 104 are prevented from being accessed to avoid the occurrence of an offset of the tracking error signal at a time of DMA access.

In addition, on the basis of the same reason as for the above-described DMA, the present embodiment in practice uses only Control Data (Control Data1, Control Data2, Control Data3 and Control Data4) in the rear recording layer 102, and does not use Control Data (Control Data1, Control Data2, Control Data3 and Control Data4) in the front recording layer 104.

On the other hand, the OPC areas in both the rear recording layer 102 and the front recording layer 104 are used. This is because the adjustment of a recording and reproduction condition adapted to a different condition in each of the rear recording layer 102 and the front recording layer 104 should be made.

However, as is understood from FIG. 7A, the front recording layer 104 has OPC disposed between a margin area M11 provided on the outer circumference side with the end position of Control Data2 on the inner circumference side as a starting point and a margin area M12 provided on the inner circumference side with the start position of DMA1 on the outer circumference side as a starting point. Incidentally, the margin areas m11 and M12 (which do not necessarily need to have a same width) are both set in consideration of at least the same items as in setting the margin areas M1 and M2 in FIG. 3 described above (the size of an unfocused laser spot and an error in lamination of disk surfaces).

Because OPC is thus disposed in the front recording layer 104, even when data is recorded in OPC for trial writing or the like, the laser spot passing through the front recording layer 104 and applied to the rear recording layer 102 at this time does not fall on the area on the outer circumference side from DMA1 or the area on the inner circumference side from Control Data2 in the same rear recording layer 102. For confirmation, the area between an end of OPC and the start position of DMA1 in the front recording layer 104 is in a state of an unrecorded area at all times. When data recording for trial writing or the like is completed in OPC, the recorded data is thereafter erased immediately, and OPC is returned to the state of an unrecorded area. That is, when recording is to be performed in OPC of the front recording layer 104, an area from OPC to the following start position of DMA1 in the rear recording layer 102 is an unrecorded area. Then, OPC on the front recording layer 104 side in this unrecorded area is obtained as an area corresponding in physical positional relation to an area formed between the margin areas M11 and M12 secured as described above. Even when laser light is focused on OPC on the front recording layer 104 side whose position is thus set, the reflected light of the unfocused laser spot applied to the rear recording layer 102 at this time does not have a difference in brightness. Hence, at the time of recording data in OPC of the front recording layer 104, an offset of the tracking error signal does not occur which offset has, as a factor thereof, a boundary between an unrecorded area and a recorded area.

The above-described rules for setting the front recording layer 104 are used, and when performing some data recording for the adjustment of a recording and reproduction condition using OPC of the front recording layer 104, the disk recording and reproducing device 1 performs control so as to access the area for OPC set as described above with reference to FIG. 7A.

It is to be noted that the example of disk area arrangement shown in FIGS. 6 to 7B described above is one example, and may thus be changed as required.

In addition, description thus far has been made supposing that sequential recording is performed from the inner circumference to the outer circumference of the rear recording layer 102 and then performed from the outer circumference to the inner circumference of the front recording layer 104. Conversely, however, data recording can be performed from the front recording layer 104 to the rear recording layer 102 in this order. In this case, recording may be performed from the inner circumference to the outer circumference of the front recording layer 104, and next recording may be performed from the outer circumference to the inner circumference of the rear recording layer 102.

The defect control according to the present embodiment is applicable to even the case where sequential recording is thus performed in the front recording layer 104 and the rear recording layer 102 in this order. That is, in this case, when a real defect area is detected in the front recording layer 104 in which recording is performed first, a pseudo defect area corresponding to this real defect area is set in the rear recording layer 102 in a similar procedure to that described with reference to FIG. 3.

In addition, description thus far has been made supposing that the multiple-layer optical disk has the two-layer structure of the rear recording layer and the front recording layer. However, the present invention is also applicable to a laminated structure including three or more recording layers. For example, in the case of three layers, the recording layer on the farthest side and the middle recording layer, for example, have a relation of one set of a first recording layer and a second recording layer, and the middle recording layer and the recording layer on the nearest side have a relation of one set of a first recording layer and a second recording layer.

In addition, the configuration of a recording device corresponding to the present invention is not limited to the contents described with reference to FIG. 1, for example. Changes and additions may be made to the configuration as appropriate. In FIGS. 8A to 8E, for example, a case of generating a tracking error signal by a push-pull method is taken as an example. However, in a configuration for tracking servo control in practice, a tracking error signal may be generated by another system. The present invention is effective also in this case.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device for performing recording supporting an optical disk-shaped recording medium having a laminated structure including a first recording layer and a second recording layer, said recording device comprising:
   a recording section configured to record data in said first recording layer and said second recording layer by irradiating the optical disk-shaped recording medium with laser light;
   a recording control section configured to control said recording section so as to perform recording in said first recording layer first and next perform recording in said second recording layer when the recording is performed sequentially on the optical disk-shaped recording medium;
   a pseudo defect area setting section configured to, when a real defect area is detected in the first recording layer while said recording section is recording data in said first recording layer, set a pseudo defect area in said second recording layer, said pseudo defect area including a corresponding area corresponding to the detected real defect area in the first recording layer in physical positional relation, a first margin area continuing from a start position of the corresponding area to a first boundary position and a second margin area continuing from an end position of the corresponding area to a second boundary position, the first and second margin areas being set such that, when the second recording layer corresponding to the first and second boundary positions is irradiated with a laser spot in a focused state, the real defect area is not irradiated with the laser spot; and
   a defect registering section configured to register said real defect area and said pseudo defect area as a defect area;
   wherein said recording control section controls the recording section so as to prevent data recording from being performed in a defect area registered by said defect registering section.

2. The recording device according to claim 1, wherein said optical disk-shaped recording medium has control and management information areas for recording information used for predetermined control and management, said control and management information areas being arranged in said first recording layer and said second recording layer, respectively, so as to correspond to each other in mutual physical positional relation, and said recording control section controls said recording section so as to record data in said control and management information area in said first recording layer and so as not to record data in said control and management information area in said second recording layer.

3. The recording device according to claim 1, wherein said optical disk-shaped recording medium has primary data recording areas for temporary data recording for a predetermined purpose, said primary data recording areas being arranged in said first recording layer and said second recording layer, respectively, so as to correspond to each other in mutual physical positional relation, and when said recording control section records data in said primary data recording area in said second recording layer, said recording control section accesses, as said primary data recording area, an area on a side of said second recording layer which area corresponds in physical positional relation to an area remaining between an area secured as a predetermined margin from a start position of an unrecorded area in said first recording layer and an area secured as a predetermined margin from an end position of the unrecorded area.

4. A recording method for performing recording supporting an optical disk-shaped recording medium having a laminated structure including a first recording layer and a second recording layer, said recording method comprising the steps of:

recording data in said first recording layer and said second recording layer by irradiating the optical disk-shaped recording medium with laser light so as to perform recording in said first recording layer first and next perform recording in said second recording layer when the recording is performed sequentially on the optical disk-shaped recording medium;

when a real defect area is detected in the first recording layer while data is being recorded in said first recording layer, setting a pseudo defect area in said second recording layer, said pseudo defect area including a corresponding area corresponding to the detected real defect area in the first recording layer in physical positional relation, a first margin area continuing from a start position of the corresponding area to a first boundary position, and a second margin area continuing from an end position of the corresponding area to a second boundary position, the first and second margin areas being set such that, when the second recording layer corresponding to the first and second boundary positions is irradiated with a laser spot in a focused state, the real defect area is not irradiated with the laser spot; and registering said real defect area and said pseudo defect area as a defect area;

wherein recording control is performed so as to prevent data recording from being performed in a registered said defect area.

5. A recording device for performing recording supporting an optical disk-shaped recording medium having a laminated structure including a first recording layer and a second recording layer, said recording device comprising:

recording means for recording data in said first recording layer and said second recording layer by irradiating the optical disk-shaped recording medium with laser light;

recording control means for controlling said recording means so as to perform recording in said first recording layer first and next perform recording in said second recording layer when the recording is performed sequentially on the optical disk-shaped recording medium;

pseudo defect area setting means for, when a real defect area is detected in the first recording layer while said recording means is recording data in said first recording layer, setting a pseudo defect area in said second recording layer, said pseudo defect area including a corresponding area corresponding to the detected real defect area in the first recording layer in physical positional relation, a first margin area continuing from a start position of the corresponding area to a first boundary position and a second margin area continuing from an end position of the corresponding area to a second boundary position, the first and second margin areas being set such that, when the second recording layer corresponding to the first and second boundary positions is irradiated with a laser spot in a focused state, the real defect area is not irradiated with the laser spot; and defect registering means for registering said real defect area and said pseudo defect area as a defect area;

wherein said recording control means controls the recording means so as to prevent data recording from being performed in a defect area registered by said defect registering means.

* * * * *